United States Patent Office 3,267,777
Patented August 23, 1966

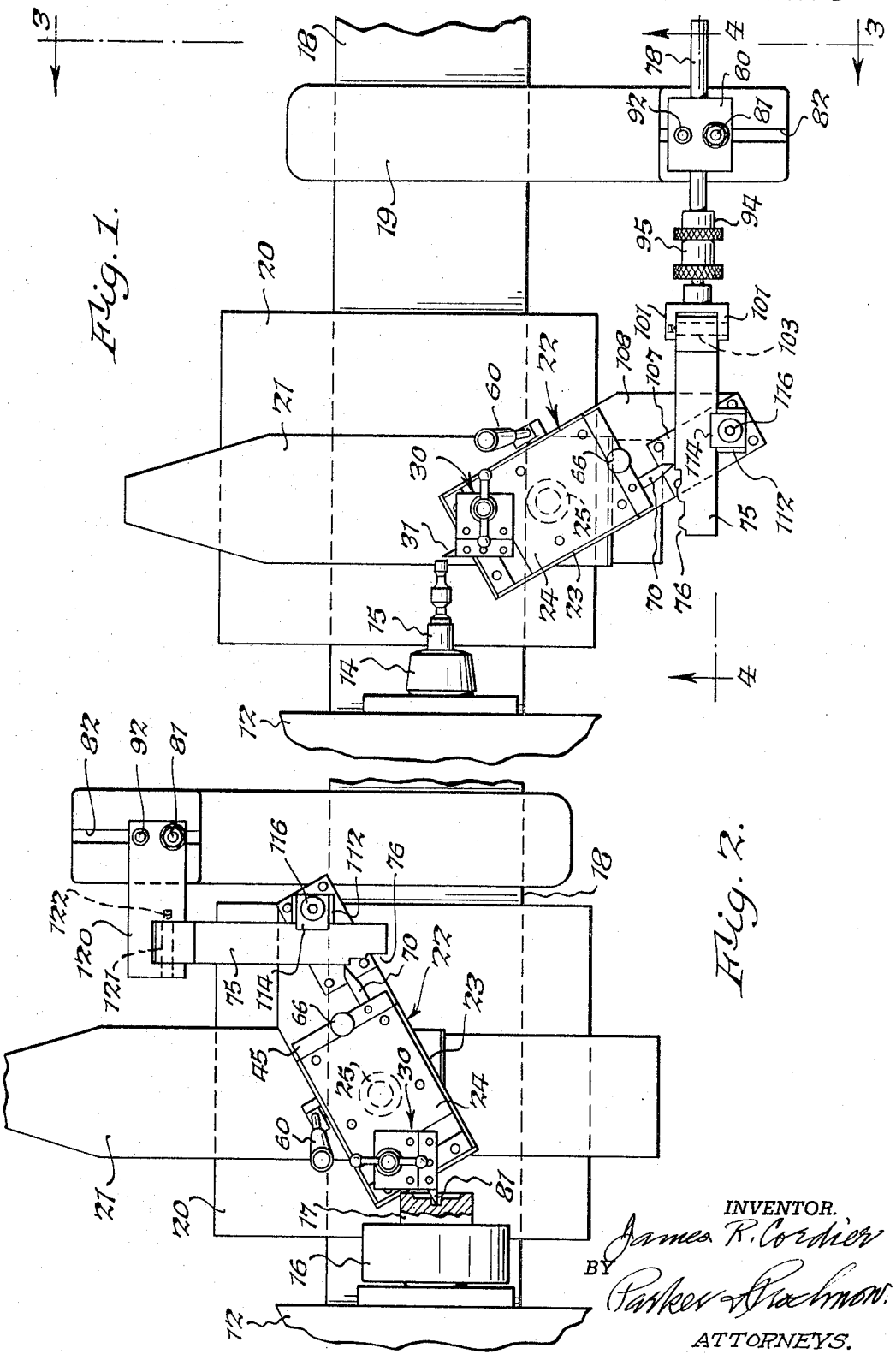

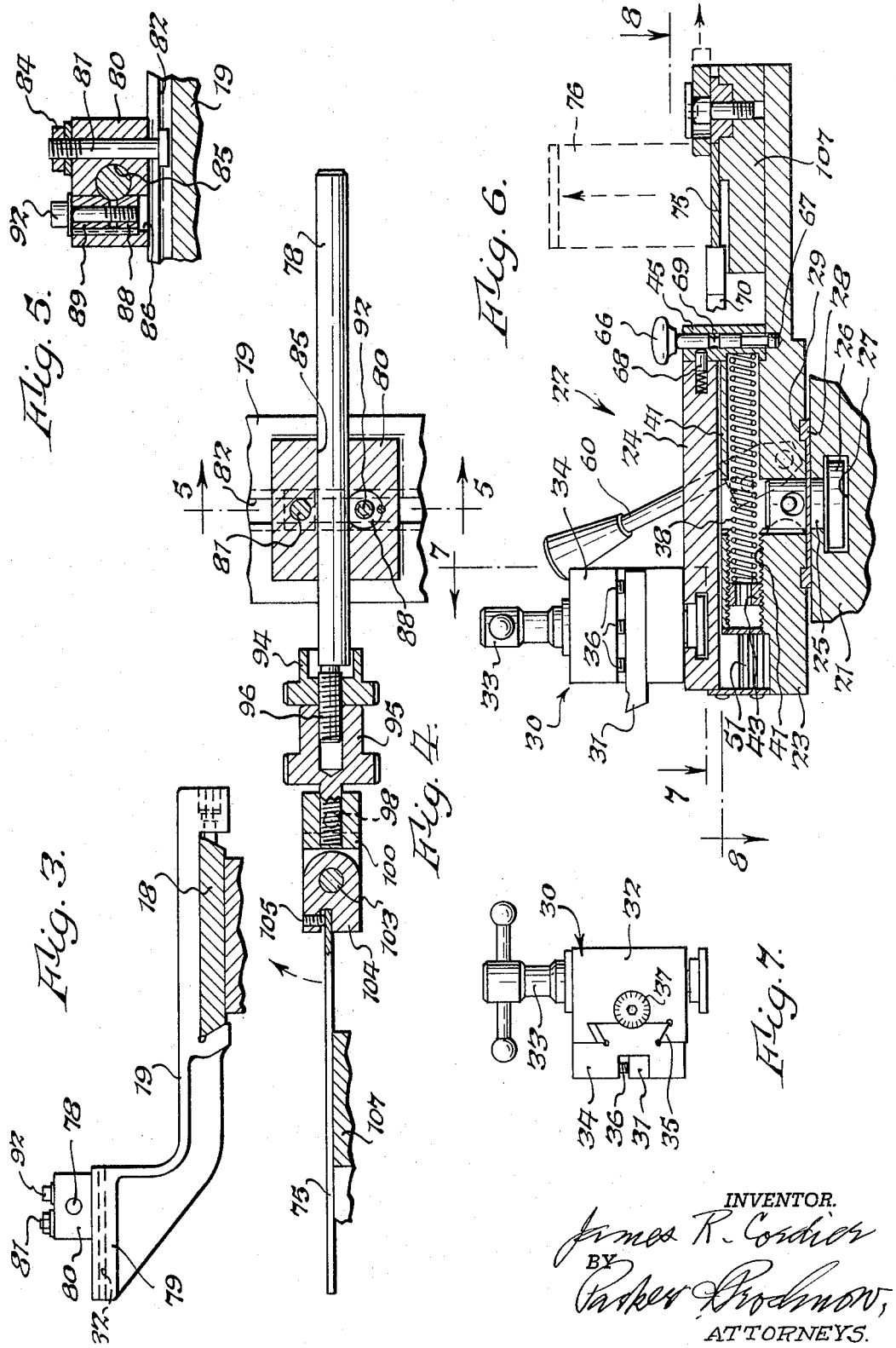

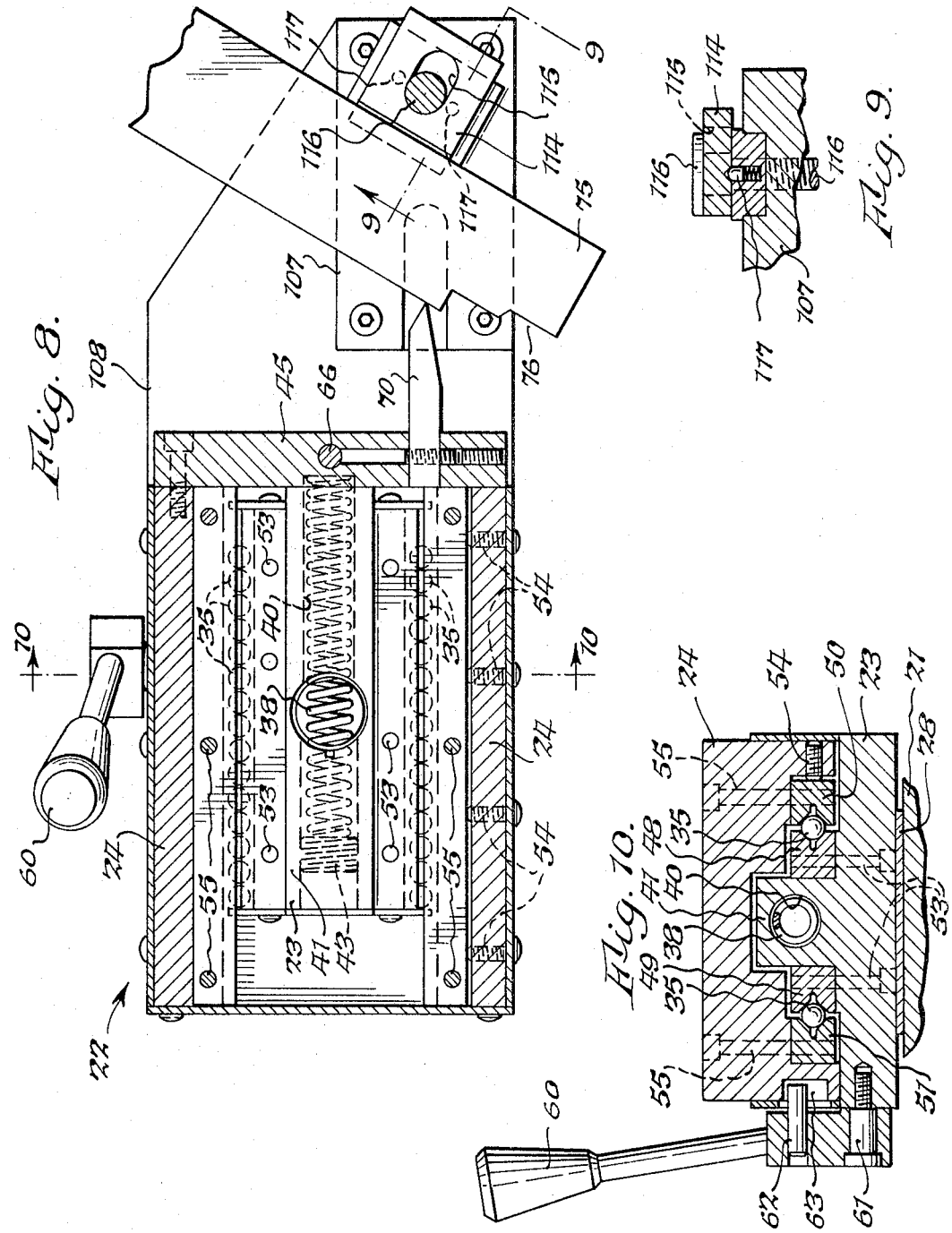

3,267,777
ATTACHMENT FOR LATHES
James R. Cordier, Elmira, N.Y., assignor to Hardinge Brothers, Inc., Elmira, N.Y.
Filed Oct. 12, 1964, Ser. No. 403,152
5 Claims. (Cl. 82—14)

This invention relates to attachments for lathes and similar machines for guiding a cutting tool to produce work in accordance with a template.

One of the objects of this invention is to produce an attachment of this kind of improved construction in which the tool slide, the movement of which is controlled by a template, is arranged at an angle to the template so that square shoulders can be formed extending in an outward direction.

A further object is to provide an attachment of this kind in which the template is mounted to swing out of operative relation to the slide to facilitate returning the slide to its starting position after a cutting operation.

A further object is to provide an attachment of this kind in which the movement of the tool slide can be changed to enable the attachment to operate parallel to the axis of the lathe spindle or in a direction transversely of the axis. It is, also, an object of this invention to provide various adjustments by means of which the template is held in correct relation to the cutting mechanism.

In the accompanying drawings:

FIG. 1 is a top plan view showing my improvement applied to a lathe for operating on work pieces in a direction lengthwise of the lathe spindle.

FIG. 2 is a top plan view thereof showing the attachment mounted on the lathe in such a manner as to operate on the outer face of a work piece while moving in a direction transverse of the axis of the lathe spindle.

FIG. 3 is an elevation of a supporting bracket for mounting a template on a lathe bed as seen from line 3—3, FIG. 1.

FIG. 4 is an elevation, partly in section, of the mounting for the template on the bracket.

FIG. 5 is a transverse section thereof on the line 5—5, FIG. 4.

FIG. 6 is a sectional elevation of the tool slide showing in elevation some of the parts mounted thereon.

FIG. 7 is a side elevation of the tool-holding part of the slide, as seen on line 7—7, FIG. 6.

FIG. 8 is a horizontal, sectional view of the tool slide taken on line 8—8, FIG. 6.

FIG. 9 is a sectional elevation thereof on line 9—9, FIG. 8.

FIG. 10 is a transverse section thereof on line 10—10, FIG. 8.

My attachment is herein illustrated as applied to a lathe having a headstock 12 within which a spindle, not shown, is journaled. The spindle has a work gripping member within a spindle nose 14 on which a work piece 15 may be gripped in the construction shown in FIG. 1. In the construction shown in FIG. 2 a different work gripping member 16 is shown having a work piece 17 supported thereon. The lathe is provided with a bed 18 of any usual or suitable construction on which the parts of my attachment may be secured by means of a bracket 19 suitably secured on the bed 18 of the lathe, for example, as shown in FIG. 3.

I have above shown my improvements applied to a lathe from which the standard compound slide is removed and in place of it a special tool slide 22 is mounted on the cross slide 21 which in turn is mounted on a carriage 20 which is mounted on the lathe bed 18 and movable lengthwise thereof.

The tool slide 22 comprises a lower part 23 which is pivotally mounted on the cross slide 21 and an upper part 24 movable lengthwise of the lower part. The lower part 23 of the tool slide may be pivotally mounted on the cross slide in any suitable manner, for example, by means of a pivot pin 25 having a head 26 extending into an undercut groove 27 in the cross slide. A bearing member or pad 28 may be provided about the pivot pin 25. The pad has an upwardly extending annular flange 29 which fits into a groove in the lower face of part 23 of the tool slide, so that the bearing pad is held in correct relation to the tool slide. By means of this pivotal connection between the cross slide and the tool slide, the tool slide can be arranged at any desired angle relatively to the axis of rotation of the work piece. The pivot pin 25 may be moved upwardly in any usual manner to force the head of this pin against the flanges extending over the groove 27. The upper part of the tool slide has a cutting tool 31 mounted in a tool holder 30, secured thereto for operating on the work.

The upper part of the tool slide has a tool post or block 32 mounted thereon, for example, by means of a bolt 33 engaging a T slot in the upper tool slide part 24. For accurate work the tool block must clamp the tool 31 very rigidly and accurately and for this purpose I have provided a tool gripping part 34 having a recess in which the tool is clamped by screws 36 and adjustable lengthwise relatively to the block 32. The tool gripping part 34 is in the form of a dovetail slide indicated generally at 35 and having a vernier adjustment screw and dial 37. This is to provide the very fine adjustment of the cutting tool for accurate size of the work piece.

This slidable upper part 24 of the tool slide is mounted on the lower part 23 by means of ball bearings 35 suitably mounted to guide the upper part of the slide for accurate and friction-free movement toward and from the work pieces. The two parts of the tool slide are biased apart by means of a spring 38 which urges the upper part of the tool slide in a direction to move the cutting tool 31 away from the work piece except when moved against the same by means of the template. The spring 38 is mounted in a bore 40 in an upwardly extending part 41 of the lower member to the tool slide. One end of this spring bears against an adjustable member 43 in the bore 40. This member is preferably adjusted toward and from the spring to vary the compression of the same. The other end of the spring bears against a back plate 45 secured to the upper part 24 of the tool slide and thus urges the tool slide to the right in FIGS. 6 and 8.

The accuracy of the movement of the upper part of the tool slide may be controlled in any suitable manner. For example, in the construction shown the ball bearings 35 operate between inner longitudinal tracks or races 48 and 49, and the balls also cooperate with outer tracks or races 50 and 51. The inner track or race is held in place by means of bolts or screws 53 so that these races rest against shoulders or flat surfaces formed on the lower part 23 of the tool slide. The outer races or tracks 50 and 51 are held to the upper part 24 of the tool slide by means of cap screws 55. Preloading of the balls and races may be accomplished by means of the lateral adjusting set screws 54 after which cap screws 55 of the race 50 will be tightened.

The upper part of the tool slide is also manually movable relatively to the lower part thereof by means of a handle 60 pivoted by means of a bolt 61 on the lower part 23 of the tool slide. The handle is also provided with a pin 62 extending into the slot 63 in the upper part 24 of the tool slide so that by swinging the hand lever 60, the upper part of the tool slide may be readily moved manually relatively to the lower part thereof against the action of the spring 38 to withdraw said stylus from engagement with said template. Any other suitable construction of a tool slide may be provided for guiding the cutting tool 31 toward and from the work.

The two parts of the tool slide may also be held in fixed relation to each other when desired, for example, when making adjustments of the mechanism. This may, for example, be effected by means of a holding pin 66, slidable in a hole in the back plate 45 of the upper part 24 of the tool slide and having its lower end arranged to enter a hole or recess 67 in the lower part 23 of the tool slide, see FIG. 6. The holding pin is yieldingly held in its upper position, in which the two parts 23 and 24 are free to move relatively to each other by means of a spring pressed retaining pin 68 positioned to enter a groove 69 in the holding pin 66. The hand lever 60 may be used for positioning the upper part of the tool slide to enable the pin 66 to enter the hole 67 in the lower part 23.

The movement of the tool slide relatively to the work may be controlled by means of a stylus 70 suitably secured on the downwardly extending flange 45 of the upper part 24 of the tool slide, and this stylus may be rigidly held in adjusted position on the tool slide in any suitable or desired manner.

The stylus cooperates with a template 75 having a pattern 76 thereon. Preferably this template is in the form of a flat plate having the pattern 76 formed on an edge thereof. From the foregoing description it will be evident that by means of the spring 38 the stylus 70 will be yieldingly urged against the template 75 so as to follow the pattern 76 thereon and this movement of the stylus is transferred through the upper part of the tool slide to the tool 31.

In mounting the template so that the same will be in fixed relation to the bed of the lathe during the operation of the cutting mechanism, I provide the bracket 19 which is secured on the lathe bed with a bar or rod 78 securely held on the bracket 19, for example, by means of a clamping or gripping member arranged on an upwardly extending part 79 of the bracket. The gripping member has a block or housing 80 secured by means of a bolt 81 having a head extending into an undercut groove or T slot 82 of the housing 80, the bolt being secured in the desired position in any suitable manner by means of nut 84.

The block or housing has a horizontally extending hole 85 passing through the same and into which the rod 78 extends, and an intersecting vertical hole 86. The vertical hole is provided with a pair of locking members 88 and 89, arranged to grip the rod 78 to hold it in adjusted position, the gripping being effected by means of bolt 92 drawing the locking members into engagement with the rod. Any other means for clamping the rod 78 is fixed position on the bracket may be provided.

The rod 78 is adjustably connected to the template by means of a threaded end 96, this end being offset eccentrically of the center axis of the rod 78. Threaded onto this end 96 is a nut part 95, which is locked in place by a jam nut 94. The nut part 95 has threaded engagement with a block 100 and is set in fixed position therewith by a set screw 98. The block 100 is bifurcated, forming a pair of lugs 101 on opposite sides of a pivot member 104 to which the template 75 is secured through the means of set screws 105.

The template 75 and pivot member 104 can swing about the pivot pin 103, which passes through the lugs 101 and the pivot member 104. In its working position the template should be in a horizontal position in line with the horizontal plane of the bed 18. It must, also, of course, be parallel to the axis of rotation of the work piece. By rotating the rod 78 and its threaded eccentric end 96, the pivot pin 103 of the pivot member 104 can be raised or lowered into parallelism and then locked by bolt 92 and its locking members.

The pin 103 could have its middle portion 106 eccentric with reference to the ends at which time threaded eccentric end 96 would be made concentric with rod 78. Consequently by turning the pin 103 about its axis, the pivot member 104 could be raised or lowered for fine adjustment of the template relatively to the axis of the lathe spindle. Any suitable means, not shown, for locking the pin 103 in any set position may be provided.

By means of this construction the template can be very accurately located so as to be at the correct elevation for cooperation with the stylus and the tool slide.

The template is guided for correct relation to the tool slide by means of a supporting platform 107 arranged on an extension 108 of the lower part 23 of the tool slide. Consequently, when the template 75 rests flatly on the platform 107, the stylus 70 will cooperate with a template so as to provide accurate movement of the cutting tool 31 relative to the work. It will be noted that the template must be in correct relation to the rod 78 and this is easily accomplished by the aforementioned adjustment to provide for the correct positioning of the template on the platform 107. By means of the eccentric adjustment, the height of the template with relation to the rod 78 can be adjusted and by means of the nut 95, the template may be moved to a limited extent relatively to the rod 78 to provide accurate adjustment so that the cutting of the workpiece will be in correct relation to the length.

The pivotal connection of 104 makes it possible to swing the template vertically out of the operative position and then again restore the template to its working position. The pattern on the template may be such that a return movement of the tool slide to its starting position may cause the stylus to be stopped by a part of the pattern. For example, as shown in FIG. 1, the pattern has a shoulder at right angles to its length, which would stop the stylus from moving to the right in FIG. 1. Consequently it is necessary for the template to be swung out of the way of the stylus when the tool carriage is returned to starting position. By swinging the template at an angle to the movement of the stylus, the template will in no way interfere with the movement of the stylus or the tool slide when the template is swung into the position as shown in broken lines in FIG. 6.

In order to insure accurate positioning of the template on the platform 107, a backstop 112 is provided, which is engaged by the edge of the template opposite to that on which the pattern is formed. To further insure accurate positioning of the template a slide 114 is provided on the backstop 112, which extends over the adjacent edge of the template and prevents swinging and raising of the template out of its correct position on the platform 107. This slide, as clearly shown in FIGS. 8 and 9, has a slot 115 through which a restraining pin or bolt 116 extends, the head of the bolt preventing the slide from moving upwardly. The slide is yieldingly held against inadvertent movement out of its holding position in any suitable manner, for example, by means of a pair of stop pins 117 urged by springs to enter into shallow recesses in the underface of the slide 114.

As a result of this construction the slide, when moved backwardly into the full line position as shown in FIG. 8, clears the template to permit it to be swung upwardly. When the slide is moved into the position indicated by the broken lines in FIG. 8, it will extend over the top of the template and thus prevent the template from swinging about its pivotal connection.

My improvements have been described as employed in connection with the movement of the tool slide and the cutting tool in a direction parallel to the axis of rotation of the work, but it is also possible to mount the mechanism in such a manner as to effect the cutting operation on the face of a workpiece by movement of the tool slide in a direction transverse of the axis of rotation of the work, as shown in FIG. 2. When this is desired, the bracket 19 is positioned on the bed of the lathe opposite to that shown in FIG. 1. When the bracket is mounted in this position as shown in FIG. 2, the rod 78 is dispensed with and a plate 120 is provided in its place, which is suitably mounted on the bracket by means of bolts having their heads extending into the T-slot 82 and a pivot pin 121, similar to the pivot member 100 shown in FIGS. 1 and 4, is provided for supporting the template 75. The tool slide 22 is then swung on its pivot 25 into a position approximately at right angles to that shown in FIG. 1. The operation of the parts will be understood so that the tool 81 may make a cut on the face of a workpiece 17.

The pivot pin 121 has the middle portion thereof eccentric to the ends and may be adjusted about its axis to position the template 75 in correct relation to the axis of the lathe spindle. The pin when correctly adjusted may then be secured in place by means of a set screw, not shown, cooperating with a threaded end 122 of the eccentric pin 121.

It will be understood that various changes in the details, materials and arrangements of parts which have been herein described and illustrated in order to explain the nature of the invention may be made by those skilled in the art within the principle and scope of the invention as expressed in the appended claims.

What is claimed is:

1. An attachment for lathes and the like having a rotary work-holding member and a stationary bed, a tool slide including an upper part and a lower part, the upper part being mounted on the lower part for longitudinal movement toward and from said rotary work-holding member, a template mounted on said bed, spring means for urging said upper member of said slide in a direction away from said work-holding member and toward said template, a stylus mounted on said upper part of said slide to contact with said template, manually operable means releasably connecting said upper and lower parts of said slide for holding said upper part in position in which said stylus is out of engagement with said template, in which said connecting means includes a pin mounted on said upper part of said slide and movable toward and from said lower part of said slide, means on said lower part of said slide for engagment with said pin to hold said upper part of said slide in position in which said stylus is out of contact with said template, means for releasably holding said pin out of engagment with said lower part of said slide, and a hand lever connecting the upper and lower parts of the slide to move said upper part of the slide into positions in which said pin holds said upper part of the slide in withdrawn position.

2. An attachment for lathes and the like having a rotary work-holding member and a stationary bed,
a tool slide including an upper part and a lower part, the upper part being mounted on the lower part for longitudinal movement toward and from said rotary work-holding member,
a template mounted on said bed,
spring means for urging said upper member of said slide in a direction away from said work-holding member and toward said template,
a stylus mounted on said upper part of said slide to contact with said template,
a lever connecting said upper and lower parts of said slide and movable manually to move said upper part of said slide against the action of said spring into a position in which said stylus is out of engagement with said template,
and a locking pin movable into position to lock the upper and lower parts of the slide in position to hold the upper part of the slide away from said template.

3. An attachment for lathes and the like having a rotary work-holding member and a stationary bed,
a tool slide including a cutting tool and mounted on said bed and guided for movement relatively to said rotary member,
guide means for said tool slide to guide said slide for movement relatively to said rotary member,
a template having a pattern on an edge thereof,
a bracket secured to said bed and supporting said template in fixed relation to said bed,
a stylus mounted on said tool slide and cooperating with said pattern on said template,
a rod secured to said bracket,
a connection between said rod and said template which includes an eccentric pin about which said template may be swung into and out of its operative position,
said eccentric pin being adjustable to vary the height of said template relatively to said rod for arranging said template in correct relation to the axis of said rotary work-holding member.

4. An attachment for lathes and the like having a rotary work-holding member and a stationary bed,
a carriage mounted on said bed for movement lengthwise thereof,
a cross slide guided for movement on said carriage,
a tool slide including a cutting tool mounted on said cross slide for movement relatively to said rotary member,
a template having a pattern on an edge thereof,
a stylus on said tool slide for cooperation with said pattern on said template,
means supporting said template in operative position to cooperate with said stylus,
a bracket secured to said stationary bed and supporting said template,
a pivotal connection between said bracket and said template for guiding said template to swing toward and from said supporting means into and out of operative relation to said stylus,
means for releasably holding said template on said supporting means in operative relation to said stylus.
and means for locking said tool slide against movement relatively to said cross slide when said template has been swung out of operative relation to said stylus to enable the lathe to be used without said template.

5. An attachment for lathes according to claim 4 in which said tool slide includes a part secured in fixed relation to said cross slide and a part slidable on said first mentioned part for movement toward and from said work-holding member and on which said stylus is mounted,
and means for locking said parts of said tool slide against relative movement when said template is positioned out of operative relation to said stylus.

References Cited by the Examiner

UNITED STATES PATENTS

| 1,195,293 | 8/1916  | Townsend   | 82—14 |
| 1,257,188 | 2/1918  | Carver     | 82—14 |
| 1,289,674 | 12/1918 | Coradi     | 82—14 |
| 1,928,373 | 9/1933  | Flatter    | 82—14 |
| 2,383,266 | 8/1945  | LeTourneau | 82—14 |

FOREIGN PATENTS 1,091,011  4/1955  France.

WILLIAM W. DYER, Jr., *Primary Examiner.*

G. A. DOST, *Assistant Examiner.*